Patented May 14, 1929.

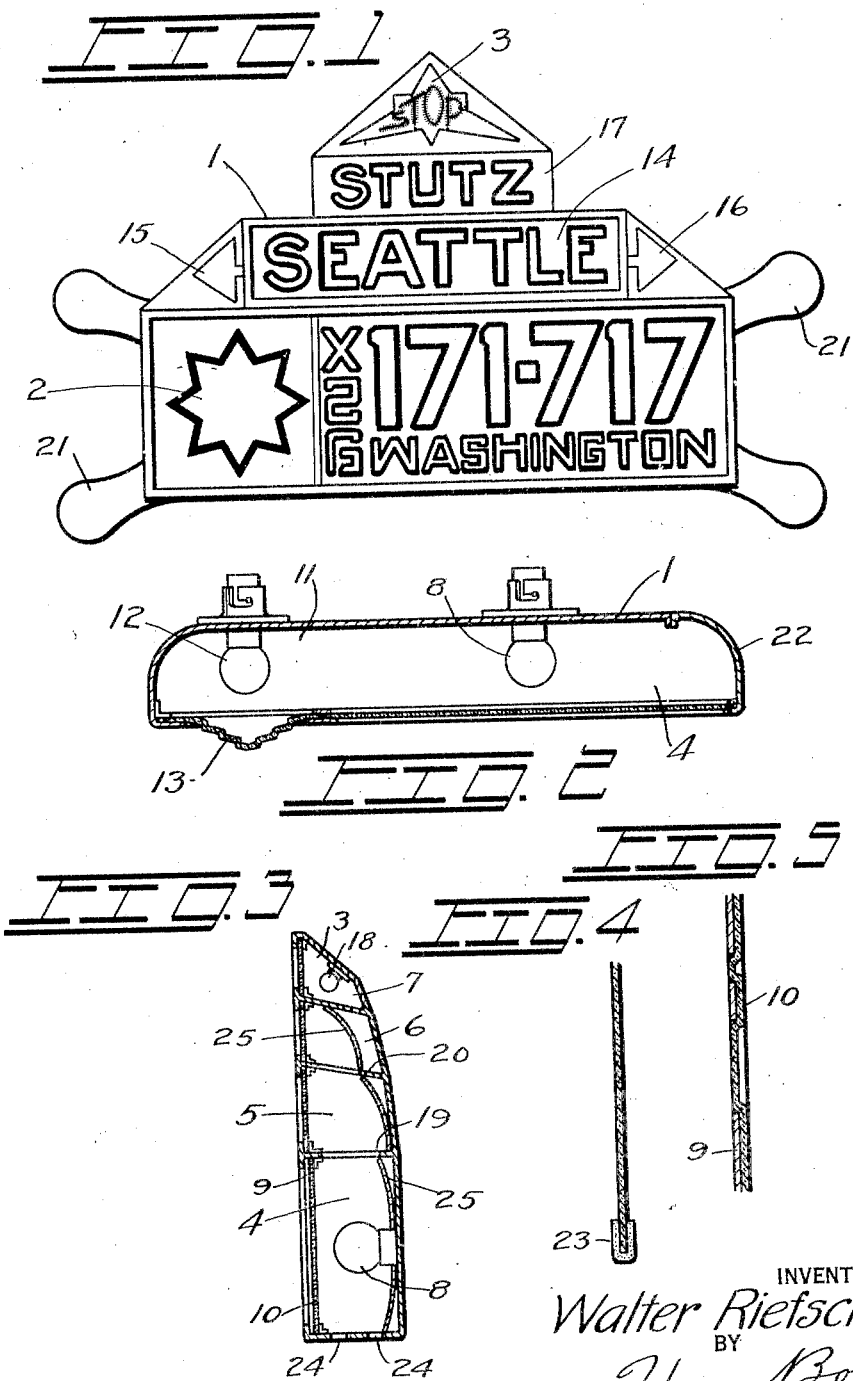

1,712,844

UNITED STATES PATENT OFFICE.

WALTER RIEFSCHNIDER, OF SEATTLE, WASHINGTON.

AUTO SIGNAL.

Application filed May 14, 1925. Serial No. 30,166.

The invention is a motor vehicle rear signal having a casing in which the license plate, tail light, stop signal, direction signals and names of the car and home city of the vehicle may be placed in such a manner that light may shine through all of the above devices as desired.

The object of the invention is to provide a rear signal which combines all of the signals used on motor vehicles with the license plate.

Another object of the invention is to provide a casing for the license plate of a motor vehicle which is so arranged that a light may shine through the plate.

And a further object of the invention is to provide a signal that may be placed at either end of a motor vehicle which combines the license with signals.

With these ends in view the invention embodies a casing having a plurality of compartments therein, means in the compartments for holding plates having characters stamped therethrough, lamps in the compartments and means for lighting and extinguishing the lamps from remote points.

Other features and advantages of the invention will appear from the following description taken in connection with the drawings, wherein:—

Figure 1 is a front view of the casing.

Figure 2 is a view showing a sectional plan.

Figure 3 is a cross section through the casing.

Figure 4 is a view showing the method of binding the edges of the glass in the front of the casing.

Figure 5 is a view showing a glass background for a metal plate in which the glass extends into openings in the plate to present a smooth surface.

In the drawing I have shown my device as it would be constructed wherein numeral 1 indicates the casing, numeral 2 the tail light in the lower part of the casing and numeral 3 the stop light at the top of the casing. The casing 1 is formed with a lower section 4, two intermediate sections 5 and 6 and an upper section 7 in which the stop light 3 is placed.

The lower section 4 is provided with a large compartment in which is a lamp 8 and in the front of which the license plate 9 as shown in Figure 3 may be placed. The lettering upon the plate may be stamped out and a red glass 10 may be placed behind it as shown in Figure 3. It is also understood that this glass may be moulded so that it will extend through the plate as shown in Figure 5 and also that the plate and glass may be arranged in any suitable manner. At one end of the lower part of the casing 1 is a section 11 having a lamp 12 in it and a lens 13 in its forward side which forms a tail light 2. It is understood that this lens may be of any suitable shape or design and the lamp may be connected in the regular tail light circuit in any suitable manner.

Above the compartment 4 is the compartment 5 in which a plate 14 may be placed and held in a manner similar to that of the plate 9 and upon which plate may be the name of a city which may be the home city of the car or any city that may be desired. At the ends of this compartment are small compartments 15 and 16 in which arrow heads may be placed as shown in Figure 1 to indicate the direction the vehicle is going to turn. These compartments may be provided with individual lamps which may be connected to any suitable switches adjacent the operator of the vehicle. The lenses in these openings may be of any suitable color; however, red is preferable in the compartment 15 and green in the compartment 16.

The compartment 6 is directly above the compartment 5 and may have the name of the car cut directly in the front plate 17 as shown. It is understood that this may have a plain red glass behind it similar to the glass 10 shown in Figure 3 or may also be provided with a glass as shown in Figure 5.

The stop signal, which is formed in the compartment 7 and provided with a lamp 18 may have the word "Stop" arranged in any suitable manner and the lamp 18 may be connected to any suitable means for automatically lighting it as the foot brake is applied. It is also understood that the stop signal may be arranged at any suitable point in the casing and connected to any suitable circuit for operating it. The casing is arranged so that the light from the lamp 8 will be reflected through the openings in the forward sides of the compartments 5 and 6 as well as the compartment 4 and the partitions 19 and 20 are omitted between these compartments.

The casing is provided with lugs 21 which may be of any suitable shape and arranged in any suitable manner to attach the casing to any suitable part of the vehicle. The ends of the compartments may be provided with doors 22 as shown in Figure 2 which may be of any suitable design and arranged in any suitable manner to permit access to the compartments so that the plates may readily be removed and replaced.

In Figure 4, I have shown a U shaped band 23 that may be placed around the edge of the glass at the front of the casing to prevent the rattling of the glass and also to seal the openings; and in the lower part of the casing are openings 24 through which any moisture that may leak into the casing may drain.

It will be understood that changes may be made in the construction without departing from the spirit of the invention. One of which changes may be in the general design of the casing, another may be in the arrangement of either of the compartments, another may be in the addition of other compartments or in the omission of some of the compartments, and still another may be in the arrangement of the lamps in the compartments.

The construction will be readily understood from the foregoing description. To use the device the casing may be attached to any suitable part of a motor vehicle and in any suitable manner and the circuits to the lamps may be arranged in any suitable manner. It will be observed that the design shown is particularly adaptable for the rear of the vehicle and when used at the front the tail and stop lights may be omitted, or all of the compartments may be omitted except that in which is the license number if desired.

It will be observed that the numbers and letters may be provided with an outline of a dark or other color, or an aluminum frame may be placed over the glass as shown by the fine lines outlining the letters in the word "Stop".

The glass may be formed in all of the letters as shown in Fig. 5 and may be of any suitable color.

Having thus fully described the invention, what I claim as new and desire to secure by Letters Patent, is:—

In a device of the class described, a casing having a horizontal compartment in the lower part thereof with an opening at the front, means for holding a license plate in a portion of the front opening thereof, means for holding a lens for a tail light also in the said front opening thereof, suitable lamps positioned behind the said license plate and tail light lens, a suitable concave reflector positioned in the said compartment and cooperating with the said lamps, another horizontal compartment above the said former compartment having openings in the upper and lower sides and front thereof, a lens in the said front opening upon which characters may be placed, a reflector in the rear of the said latter compartment adapted to receive rays of light from the lamps of the said lower compartment and reflect them through the opening at the front of the said latter compartment, another horizontal compartment above the said latter compartment having an opening at the front and in the lower side thereof, a lens in the said front opening with lettering thereon, a reflector in the rear thereof and positioned slightly ahead of the reflector in the adjoining compartment and adapted to reflect rays from the lamps in the lower compartment outward through the said lens in the front thereof, and another horizontal compartment having an opening in the front thereof in which a lens with suitable indications thereon may be placed and provided with an individual lamp with suitable reflecting surfaces.

WALTER RIEFSCHNIDER.